H. W. BACHMAN.
Improvement in Back-Lash Springs for Machinery.

No. 132,347.  Patented Oct. 22, 1872.

Witnesses:
A. W. Almqvist
C. Sedgwick

Inventor:
H. W. Bachman
PER
Attorneys.

UNITED STATES PATENT OFFICE.

HIRAM W. BACHMAN, OF McLEAN, ILLINOIS.

IMPROVEMENT IN BACK-LASH SPRINGS FOR MACHINERY.

Specification forming part of Letters Patent No. 132,347, dated October 22, 1872.

*To all whom it may concern:*

Be it known that I, HIRAM W. BACHMAN, of McLean, in the county of McLean and State of Illinois, have invented a new and useful Improvement in Back-Lash Springs, of which the following is a specification:

My invention consists in the employment of two back-lash springs for connecting the spindle and pinion of mill-gearing or other gearing, the said springs being connected to the collar on the spindle and to the pinion on opposite sides, so as to equalize the bearing of the collar and pinion on the spindle and prevent the wearing of the parts in the localities where the bearings come when one spring is used, which very soon makes such looseness as to cause the pinion and collar to wabble, which creates back-lash even with a spring connection, and makes it necessary to frequently refit the spindle pinion and collar.

Figure 1:
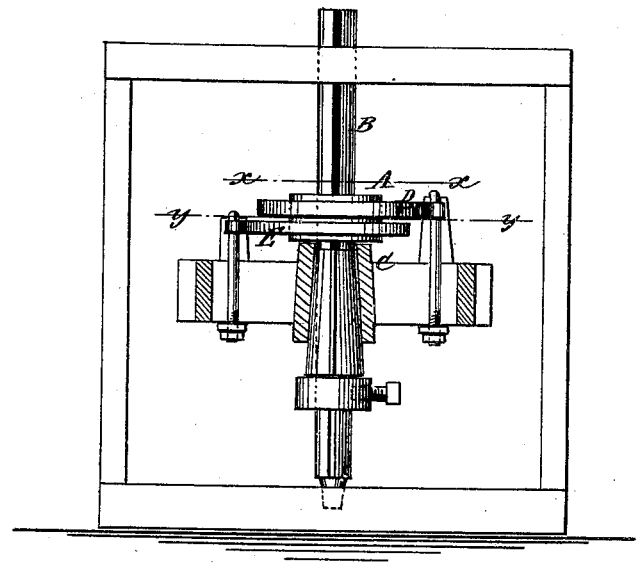
Figure 2:
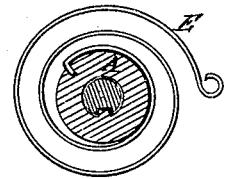
Figure 3:
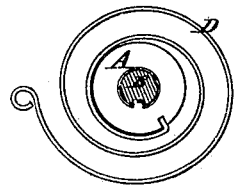

Figure 1 is a sectional elevation of the pinion and side elevation of the other parts, showing the application of my invention. Fig. 2 is a horizontal section taken on the line $y\ y$ of Fig. 1; and Fig. 3 is a horizontal section on the line $x\ x$ of Fig. 1.

Similar letters of reference indicate corresponding parts.

A represents the collar, which is fitted on the spindle B above the pinion C for connecting the inner ends of the springs D E. This collar is fitted on the spindle with the spline F, so that it will slide up and down, as required to shift the pinion in or out of gear with the spur-wheel, and at the same time impart the motion of the pinion to the spindle. These springs are, as will be seen by inspection of the drawing, connected to this collar on opposite sides of the axis of the spindle, and also connected in like manner to the pinion, so that the application of the force to the spindle is equalized on the two opposite sides of the collar, and in like manner the resistance of the springs on the pinion is divided between the two opposite points in such manner that there is no cramping or twisting action between them and the spindle as there is when only one spring is used, consequently there are no undue local strains to cause the parts to wear out of true in the bearing-surfaces. I may have four or six springs applied in the same manner in cases where two are not enough; but the principle is the same.

Having thus described my invention, I claim as new, and desire to secure by Letters Patent—

Two back-lash springs, connected to the collar of the spindle and the pinion on opposite sides of the axis of the spindle, substantially in the manner described.

HIRAM W. BACHMAN.

Witnesses:
W. C. GRATT,
M. G. HAUGHEY.